US010565157B1

(12) United States Patent
Zhou

(10) Patent No.: US 10,565,157 B1
(45) Date of Patent: Feb. 18, 2020

(54) I2C DATA COMMUNICATION SYSTEM AND METHOD APPLIED BETWEEN MULTIPLE MASTER DEVICES

(71) Applicant: HONGFUJIN PRECISION ELECTRONICS (TIANJIN) CO., LTD., Tianjin (CN)

(72) Inventor: Xiao-Long Zhou, Tianjin (CN)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/448,093

(22) Filed: Jun. 21, 2019

(30) Foreign Application Priority Data

May 24, 2019 (CN) .......................... 2019 1 0441725

(51) Int. Cl.
*G06F 13/12* (2006.01)
*G06F 13/42* (2006.01)

(52) U.S. Cl.
CPC .. *G06F 13/4291* (2013.01); *G06F 2213/0016* (2013.01)

(58) Field of Classification Search
CPC .... G06F 13/42; G06F 13/364; G06F 13/4291; G06F 13/4282

USPC .............................................. 710/5
See application file for complete search history.

(56) References Cited

U.S. PATENT DOCUMENTS

| 2006/0174044 | A1* | 8/2006 | Bomhoff | ............ | G06F 13/4286 710/110 |
| 2007/0220190 | A1* | 9/2007 | Hidai | .................. | G06F 13/4282 710/110 |
| 2013/0067134 | A1* | 3/2013 | Austen | ................ | G06F 13/4291 710/305 |
| 2015/0074305 | A1* | 3/2015 | Sengoku | ................. | G06F 13/24 710/110 |
| 2016/0147707 | A1* | 5/2016 | Freudenberger | .... | G06F 13/4291 710/110 |
| 2016/0364361 | A1* | 12/2016 | Bubb | .................. | G06F 13/4282 |

* cited by examiner

*Primary Examiner* — Titus Wong
(74) *Attorney, Agent, or Firm* — ScienBiziP, P.C.

(57) ABSTRACT

A data communication system applied in an Inter-Integrated Circuit (I2C) bus serving more than one master device includes a first master device, a second master device, and a logic control unit. The logic control unit receives serial data line (SDA) signal and serial clock line (SCL) signal from the I2C bus of the first master device and of the second master device, and determines a priority between the first master device and the second master device, control of the I2C bus without prejudicing any current messaging is allocated accordingly. A data communication method is also provided.

17 Claims, 4 Drawing Sheets

I2C DATA COMMUNICATION SYSTEM AND METHOD APPLIED BETWEEN MULTIPLE MASTER DEVICES

FIELD

The subject matter herein generally relates to data communications.

BACKGROUND

The specification for an Inter-Integrated Circuit (I2C) communication protocol defines an arbitration mechanism, but such mechanism allocates no priority between master devices. A master device can get the communication right depending on the communication data itself. When there are multiple master devices on the bus, the general arbitration mechanism cannot prioritize between them.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
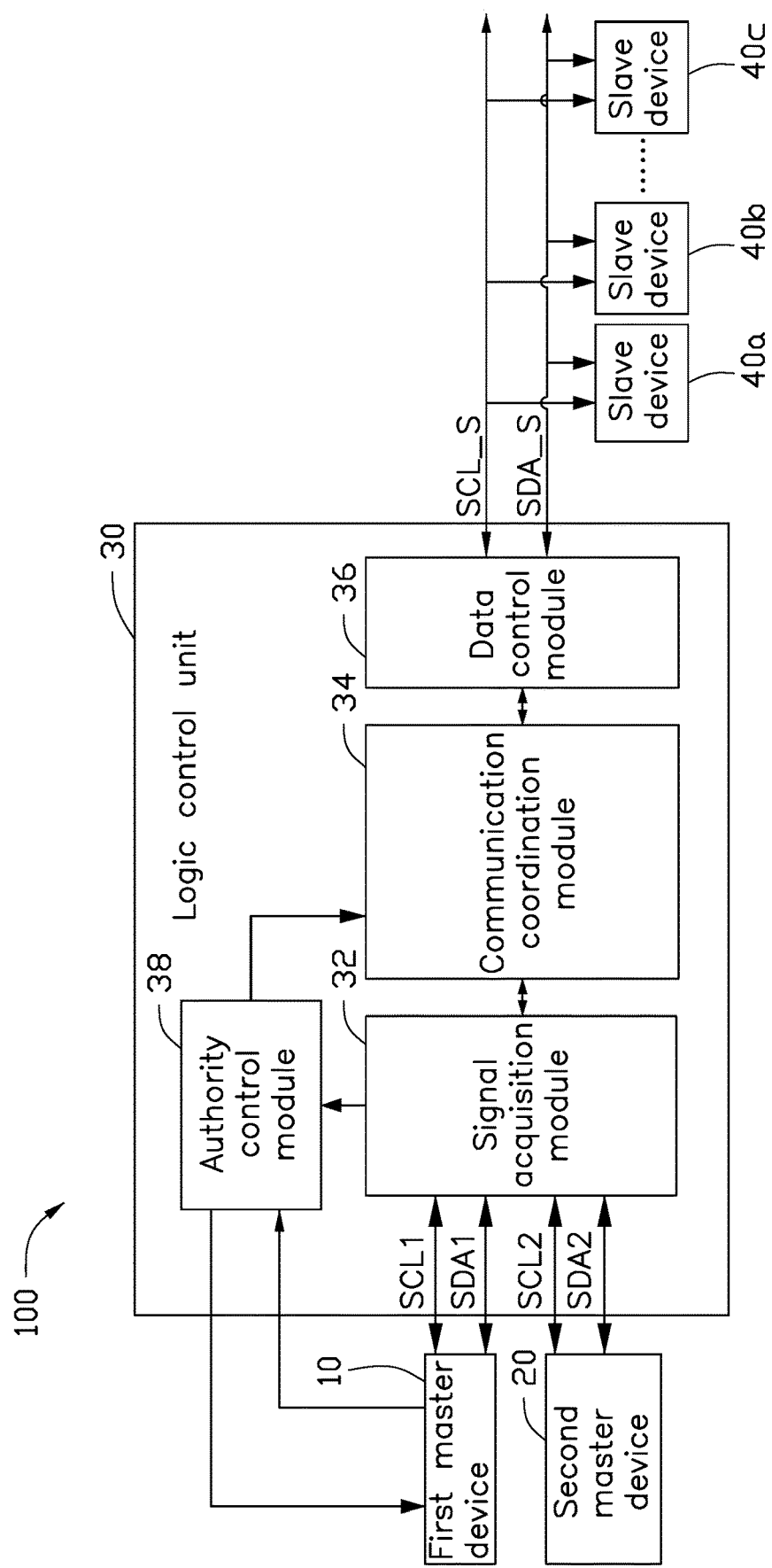
FIG. 1 is a block diagram of an embodiment of a data communication system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a data communication system 100 in accordance with an embodiment of the present disclosure.

The data communication system 100 includes a first master device 10, a second master device 20, a logic control unit 30, and a plurality of slave devices.

The logic control unit 30 facilitates communication between the first master device 10, the second master device 20, and the plurality of slave devices by data transmission. In this embodiment, the plurality of slave devices includes slave devices 40a, 40b, and 40c.

In one embodiment, the logic control unit 30 may be a field-programmable gate array (FPGA).

In other embodiment, the logic control unit 30 may be a complex programmable logic device (CPLD).

In FIG. 1, an Inter-Integrated Circuit (I2C) bus (SCL1, SDA1) and (SCL2, SDA2) starting from the master device 20 can connect with a plurality of I2C buses (SCL_S, SDA_S) by the processing of an I2C transparent bridge of the logic control unit 30.

The logic control unit 30 receives serial data line (SDA) signal and serial clock line (SCL) signal from the I2C bus of the first master device 10 and of the second master device 20 in real time.

The logic control unit 30 determines a priority between the first master device 10 and the second master device 20, and allocates control of the I2C bus according to the priority between the first master device 10 and the second master device 20.

In the embodiment, the first master device 10 is a high priority master device, and the second master device 20 is a low priority master device.

In at least one embodiment, the logic control unit 30 includes a signal acquisition module 32, a communication coordination module 34, a data control module 36, and an authority control module 38.

The signal acquisition module 32 receives the SCL signal and the SDA signal from the I2C bus of the first master device 10 and the second master device 20, and obtains communication messages of the first master device 10 and the second master device 20 according to the SCL signal and the SDA signal. In the embodiment, the communication messages may be a start+address broadcast message+read/write (Start+Address+W/R).

When the first master device 10 initiates communication with the slave device 40a, the signal acquisition module 32 obtains the communication messages of the first master device 10. At this time, the communication coordination module 34 suspends communication by the first master device 10. The communication messages of the first master device 10 are suspended by the I2C clock extension mechanism, and the message of the first master device 10 is registered in the logic control unit 30. The signal acquisition module 32 can determine at all times whether the second master device 20 is in an idle state.

If the second master device 20 is in an idle state, the data control module 36 transmits the messages to the slave device 40a, and withdraws the suspension of communications of the first master device 10. The first master device 10 establishes a connection with the slave device 40a, at this time the first master device 10 has control of the I2C bus.

If the second master device 20 is not in an idle state, the second master device 20 is in a state of communication. The signal acquisition module 32 determines whether a current message of the second master device 20 and the slave device 40a has been completed. If the message of the second master device 20 and the slave device 40a has been completed, the communication coordination module 34 interrupts the connection between the second master device 20 and the slave device 40a, and initiates a stop message to the second master device 20 and the slave device 40a. The data control module 36 transmits messages intended for the slave device 40a, and withdraws the suspension on communication of the first master device 10. The first master device 10 can then establish a connection with the slave device 40*a*. At this time, the first master device 10 has control of the I2C bus.

When the second master device 20 requires to initiate communication with the slave device 40*a*, the signal acquisition module 32 obtains the messages of the second master device 20, and the communication coordination module 34 suspends communication of the second master device 20. The message or messages of the second master device 20 is registered in the logic control unit 30. The signal acquisition module 32 determines whether the first master device 10 is in an idle state.

If the first master device 10 is in an idle state, the data control module 36 transmits the messages of the second master device 20 to the slave device 40*a*, and withdraws the suspension of communication of the second master device 20. The second master device 20 establishes a connection with the slave device 40*a*. At this time, the second master device 20 has control of the I2C bus.

If the first master device 10 is not in an idle state, the first master device 10 is in a state of communication. The authority control module 38 outputs a request signal to the first master device 10.

If the first master device 10 does not respond to the request signal, the communication coordination module 34 initiates a stop message to the second master device 20. At this time, the first master device 10 has control of the I2C bus.

If the first master device 10 responds to the request signal, the signal acquisition module 32 determines whether a current message of the first master device 10 and the slave device 40*a* has been completed. If the message of the first master device 10 and the slave device 40*a* has been completed, the communication coordination module 34 will interrupt the connection between the first master device 10 and the slave device 40*a*, and initiate a stop message to the first master device 10 and the slave device 40*a*. The data control module 36 transmits the messages of the second master device 20 to the slave device 40*a*, and withdraws the suspension of communication of the second master device 20. The second master device 20 establishes a connection with the slave device 40*a*. At this time, the second master device 20 has control of the I2C bus.

By analogy, if the first master device 10 and the second master device 20 both initiate respective communications with the slave device 40*b* and/or the slave device 40*c*, the logic control unit 30 can allocate control of the I2C bus according to the priority between the first master device 10 and the second master device 20 and the received SCL signal and SDA signal.

Figure 2:
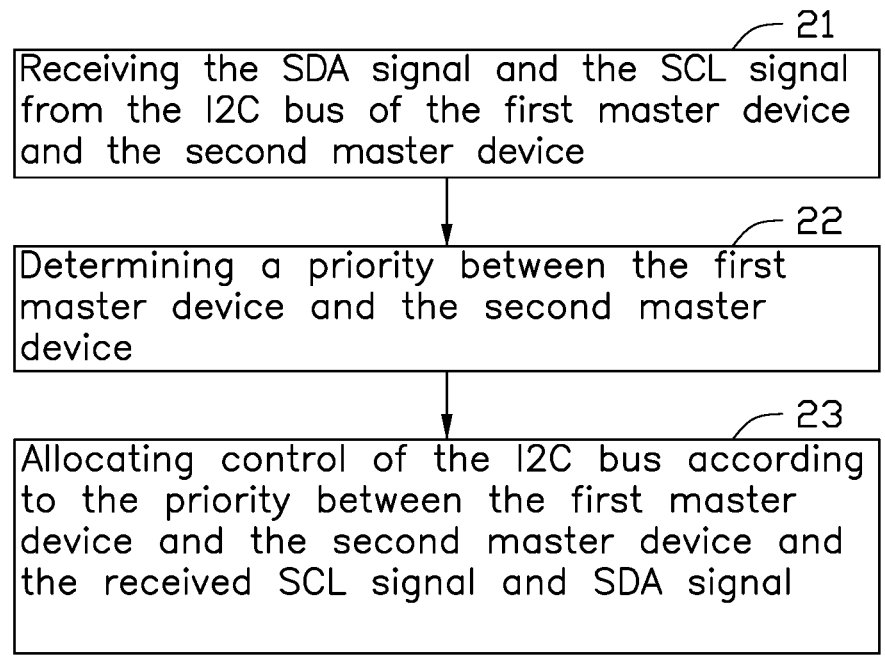
FIG. 2 is flowchart of an embodiment of a method for data communication.

FIG. 2 is flowchart depicting an embodiment of a method for data communication on an I2C bus carrying multiple master devices. The method is provided by way of example, as there are a variety of ways to carry out the method. The method described below can be carried out using the configurations illustrated in FIG. 1 for example, and various elements of these figures are referenced in explaining the example method. Each block shown in FIG. 1 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 21.

At block 21, the signal acquisition module 32 receives serial data line (SDA) signal and serial clock line (SCL) signal from the I2C bus of the first master device 10 and the second master device 20 in real time.

At block 22, the logic control unit 30 determines a priority between the first master device 10 and the second master device 20.

In one embodiment, the first master device 10 is a high priority master device, and the second master device 20 is a low priority master device.

At block 23, the logic control unit 30 allocates control of the I2C bus according to the priority between the first master device 10 and the second master device 20 and the received SCL signal and SDA signal.

Figure 3:
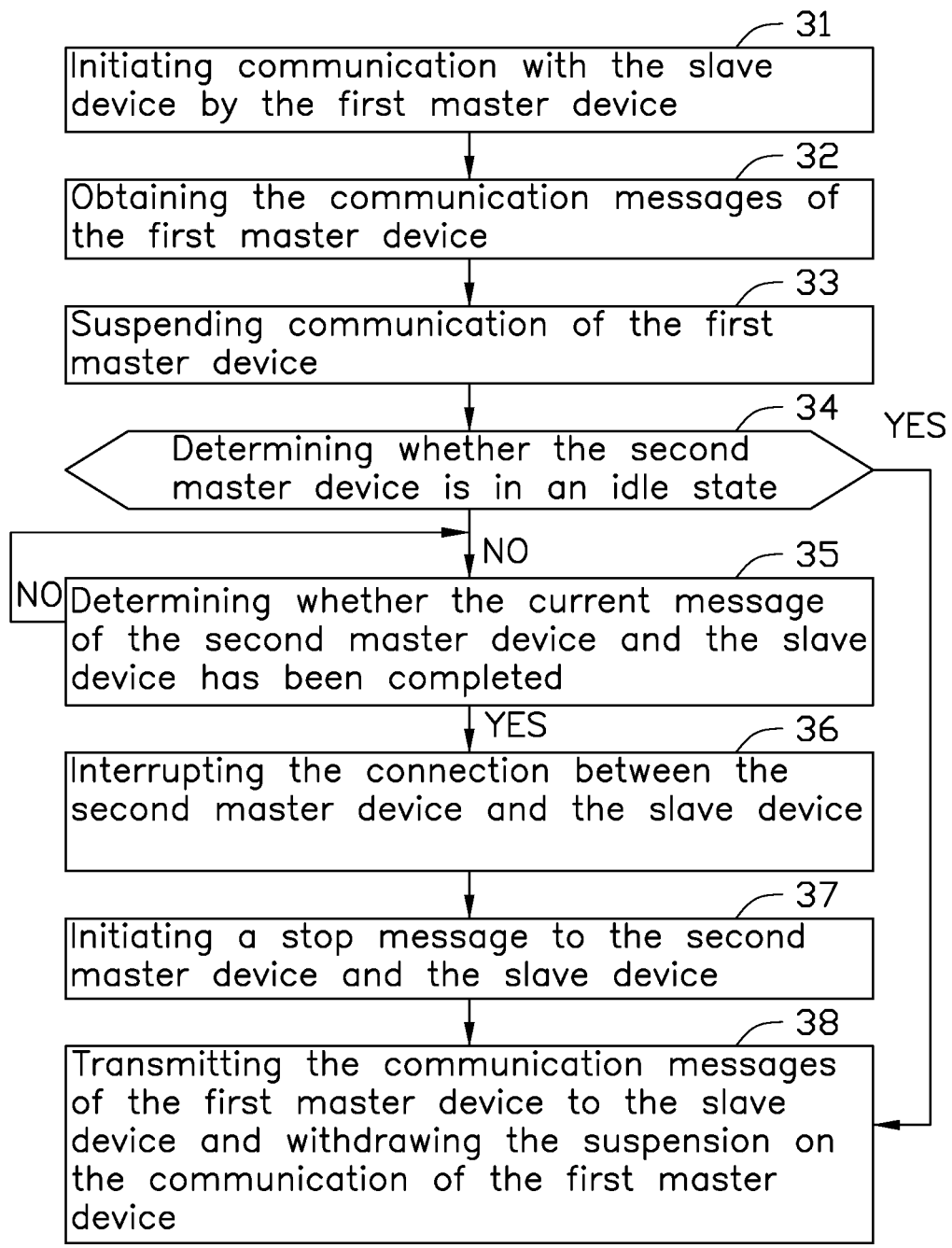
FIGS. 3 and 4 are flowcharts of a method for an I2C control allocation process in one embodiment.

FIG. 3 illustrates a flow diagram of an embodiment of an I2C control allocation method. The example method can begin at block 31.

At block 31, the first master device 10 requires to initiate communication with the slave device 40*a*.

At block 32, the signal acquisition module 32 obtains the communication messages of the first master device 10.

At block 33, the communication coordination module 34 suspends communication of the first master device 10.

For example, the communication messages of the first master device 10 are suspended by the I2C clock extension mechanism, and the message of the first master device 10 is registered in the logic control unit 30.

At block 34, the signal acquisition module 32 determines whether the second master device 20 is in an idle state. If the second master device 20 is in an idle state, block 38 is implemented, otherwise block 35 is implemented.

At block 35, the signal acquisition module 32 determines whether the current message of the second master device 20 and the slave device 40*a* has been completed. If the messages of the second master device 20 and the slave device 40*a* has been completed, block 36 is implemented, otherwise returns to block 35.

At block 36, the communication coordination module 34 interrupts the connection between the second master device 20 and the slave device 40*a*.

At block 37, the communication coordination module 34 initiates a stop message to the second master device 20 and the slave device 40*a*.

At block 38, the data control module 36 transmits the communication messages of the first master device 10 to the slave device 40*a*, and withdraws the suspension on the communication of the first master device 10.

The first master device 10 establishes a connection with the slave device 40*a*. At this time, the first master device 10 has control of the I2C bus.

Figure 4:
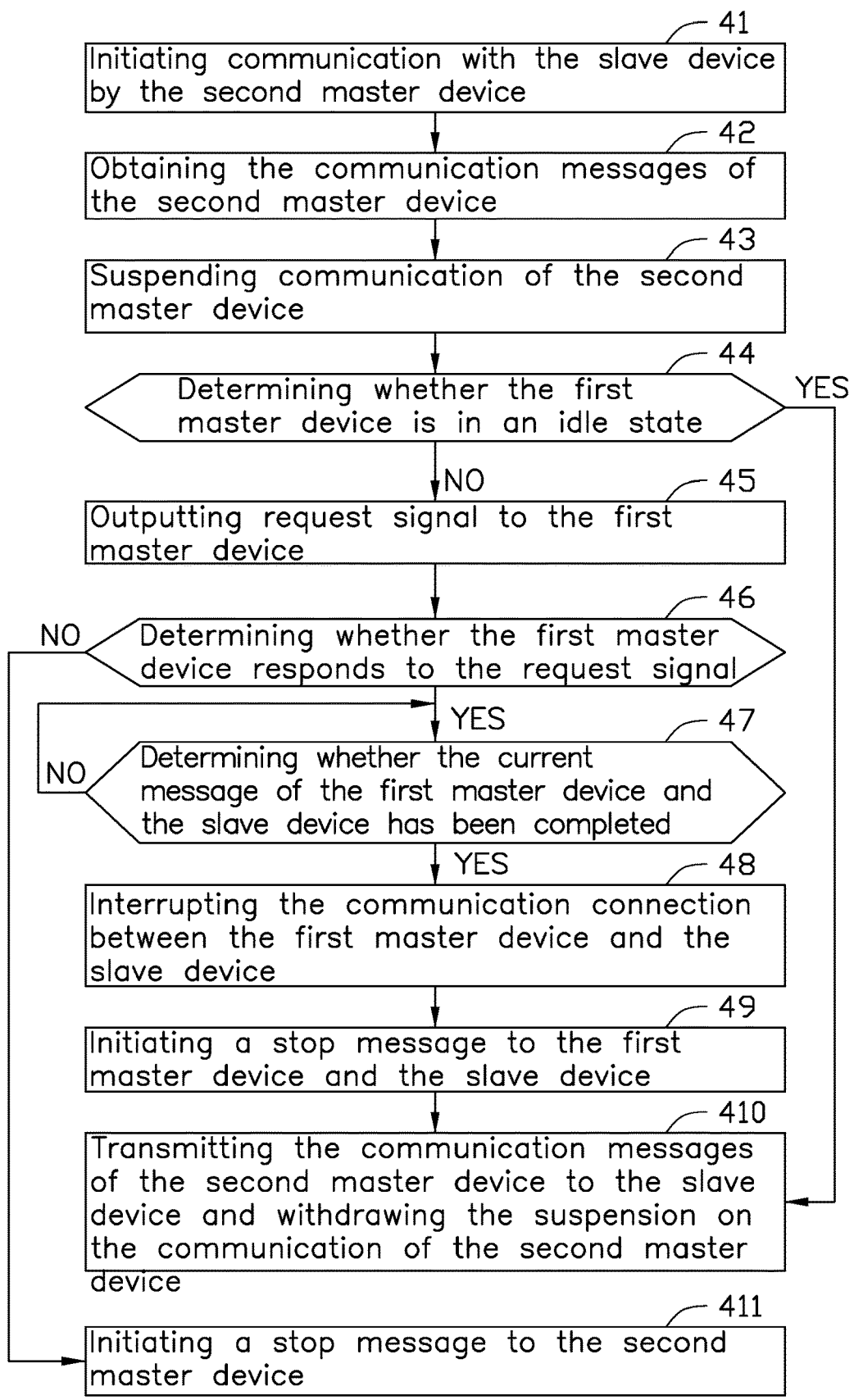

FIG. 4 illustrates a flow diagram of another embodiment of the I2C control allocation method. The example method can begin at block 41.

At block 41, the second master device 20 requires to initiate communication with the slave device 40*a*.

At block 42, the signal acquisition module 32 obtains the communication messages of the second master device 20.

At block 43, the communication coordination module 34 suspends communication of the second master device 20.

At block 44, the signal acquisition module 32 determines whether the first master device 10 is in an idle state. If the first master device 10 is in an idle state, block 410 is implemented, otherwise block 45 is implemented.

At block 45, the authority control module 38 outputs a request signal to the first master device 10.

At block 46, the first master device 10 determines whether to respond to the request signal. If the first master device 10 responds to the request signal, block 47 is implemented, otherwise block 411 is implemented.

At block 47, the signal acquisition module 32 determines whether the current message of the first master device 10 and the slave device 40a has been completed. If the messages of the first master device 10 and the slave device 40a has been completed, block 48 is implemented, otherwise returns to block 47.

At block 48, the communication coordination module 34 interrupts the connection between the first master device 10 and the slave device 40a.

At block 49, the communication coordination module 34 initiates a stop message to the first master device 10 and the slave device 40a.

At block 410, the data control module 36 transmits the communication messages of the second master device 20 to the slave device 40a, and withdraws the suspension on the communication of the second master device 20 hangs.

The second master device 20 establishes a connection with the slave device 40a. At this time, the second master device 20 has control of the I2C bus.

At block 411, the communication coordination module 34 initiates a stop message to the second master device 20. At this time, the first master device 10 has control of the I2C bus.

Therefore, the data communication system and method can realize the switching of the bus control right in the state of the multi-master device, and can improve the stability of the system, and optimize the I2C arbitration scheme to meet the actual system design requirements.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A data communication system, comprising:
   a first master device and a second master device; and
   a logic control unit coupling the first master device and the second master device, and receiving serial data line (SDA) signal and serial clock line (SCL) signal from an Inter-Integrated Circuit (I2C) bus of the first master device and the second master device;
   wherein the logic control unit determines a priority between the first master device and the second master device, and allocates control of the I2C bus according to the priority between the first master device and the second master device and the received SCL signal and SDA signal; wherein the logic control unit comprises a signal acquisition module, a communication coordination module, and an authority control module;
   wherein when the second master device initiates communication with the slave device, the signal acquisition module obtains the communication messages of the second master device, and the communication coordination module suspends communication of the second master device; wherein the first master device is a high priority master device and the second master device is a low priority master device; the signal acquisition module determines whether the first master device is in an idle state; when the first master device is not in the idle state, the authority control module outputs request signal to the first master device, when the first master device does not respond to the request signal, the communication coordination module initiates the stop message to the second master device.

2. The data communication system of claim 1, wherein the signal acquisition module receives the SCL signal and the SDA signal from the I2C bus of the first master device and the second master device, and obtains communication messages of the first master device and the second master device.

3. The data communication system of claim 2, wherein when the first master device initiates communication with a slave device, the signal acquisition module obtains the communication messages of the first master device, the communication coordination module suspends communication of the first master device, and the signal acquisition module determines whether the second master device is in an idle state.

4. The data communication system of claim 3, wherein the logic control unit further comprises a data control module; wherein when the second master device is in an idle state, the data control module transmits the communication messages to the slave device, and withdraws the suspension on the communication of the first master device, and the first master device establishes a connection with the slave device.

5. The data communication system of claim 4, wherein when the second master device is in a non-idle state, the signal acquisition module determines whether current message of the second master device and the slave device has been completed; wherein when the current message of the second master device and the slave device has been completed, the communication coordination module interrupts connection between the second master device and the slave device, and initiates a stop message to the second master device and the slave device; and wherein the data control module transmits the communication messages to the slave device, and withdraws the suspension on the communication of the first master device, and the first master device establishes the connection with the slave device.

6. The data communication system of claim 5, wherein when the first master device is in an idle state, the data control module transmits the communication messages of the second master device to the slave device, and withdraws the suspension on the communication of the second master device, and the second master device establishes the connection with the slave device.

7. The data communication system of claim 6, wherein when the first master device responds to the request signal, the signal acquisition module determines whether the current message of the first master device and the slave device has been completed.

8. The data communication system of claim 7, wherein when the current message of the first master device and the slave device has been completed, the communication coordination module interrupts the connection between the first master device and the slave device, and initiates the stop message to the first master device and the slave device, the data control module transmits the communication messages of the second master device to the slave device, and withdraws the suspension on the communication of the second master device, and the second master device establishes the connection with the slave device.

9. The data communication system of claim 1, wherein the logic control unit is a complex programmable logic device (CPLD) or a field programmable gate array (FPGA).

10. A data communication method, comprising:
receiving serial data line (SDA) signal and serial clock line (SCL) signal from an Inter-Integrated Circuit (I2C) bus of a first master device and a second master device;
determining a priority between the first master device and the second master device; and
allocating control of the I2C bus according to the priority between the first master device and the second master device and the received SCL signal and SDA signal;
obtaining the communication messages of the second master device and suspending communication of the second master device when the second master device initiates communication with the slave device;
determining whether the first master device is in an idle state;
outputting request signal to the first master device when the first master device is not in the idle state; and
initiating the stop message to the second master device when the first master device does not respond to the request signal;
wherein the first master device is a high priority master device and the second master device is a low priority master device.

11. The data communication method of claim 10, wherein further comprising:
obtaining communication messages of the first master device and the second master device when the SCL signal and the SDA signal from the I2C bus of the first master device and the second master device is received.

12. The data communication method of claim 11, wherein further comprising:
obtaining the communication messages of the first master device when the first master device initiates communication with a slave device; and
suspending communication of the first master device; and
determining whether the second master device is in an idle state.

13. The data communication method of claim 12, wherein further comprising:
transmitting the communication messages to the slave device and withdrawing the suspension on the communication of the first master device when the second master device is in an idle state.

14. The data communication system of claim 13, wherein further comprising:
determining whether current message of the second master device and the slave device has been completed when the second master device is not in an idle state;
interrupting connection between the second master device and the slave device and initiating a stop message to the second master device and the slave device when the current message of the second master device and the slave device has been completed; and
transmitting the communication messages to the slave device and withdrawing the suspension on the communication of the first master device.

15. The data communication method of claim 14, wherein further comprising:
transmitting the communication messages of the second master device to the slave device and withdrawing the suspension on the communication of the second master device when the first master device is in an idle state.

16. The data communication method of claim 15, wherein further comprising:
determining whether the current message of the first master device and the slave device has been completed when the first master device responds to the request signal.

17. The data communication method of claim 16, wherein further comprising:
interrupting the connection between the first master device and the slave device and initiating the stop message to the first master device and the slave device when the current message of the first master device and the slave device has been completed; and
transmitting the communication messages of the second master device to the slave device and withdrawing the suspension on the communication of the second master device.

* * * * *